Figure 7:
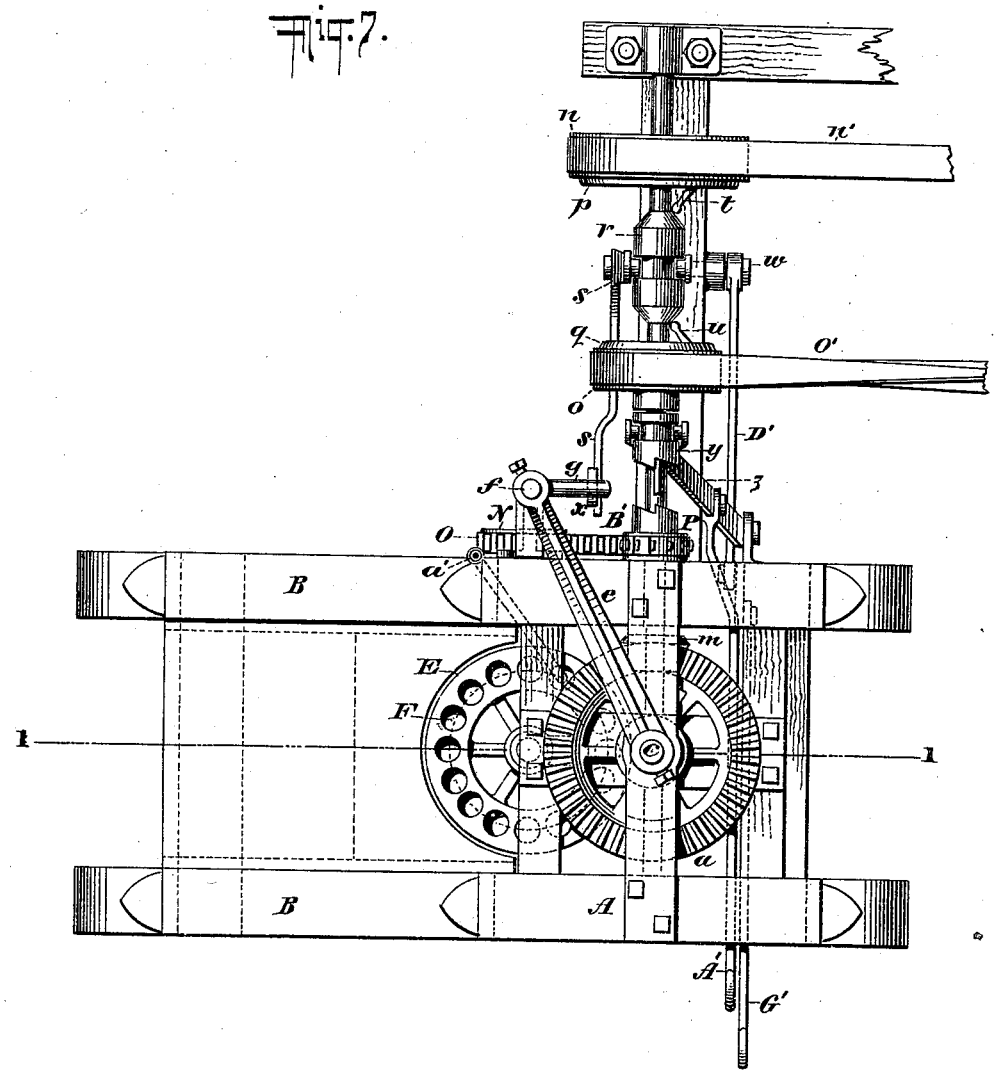

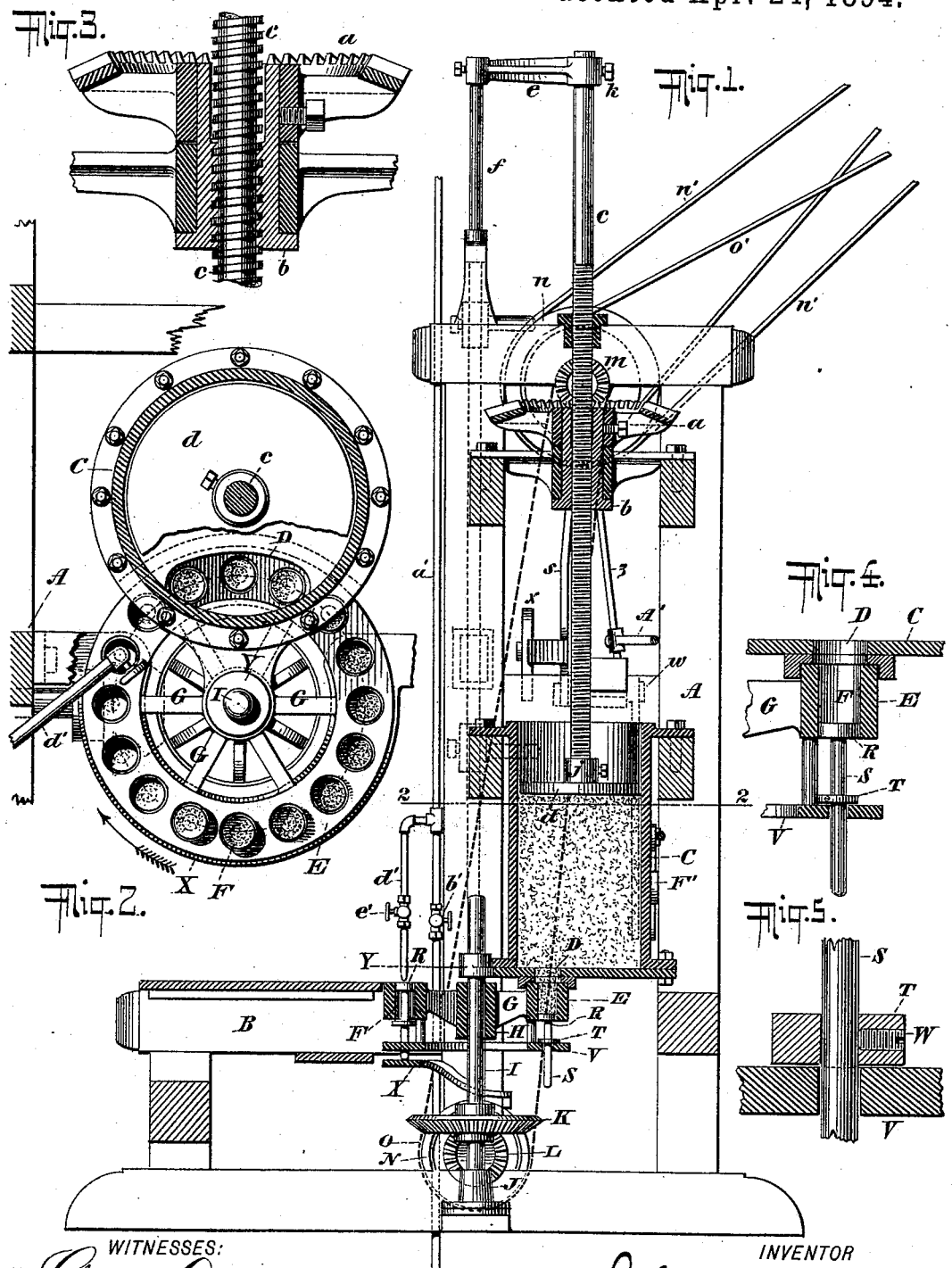

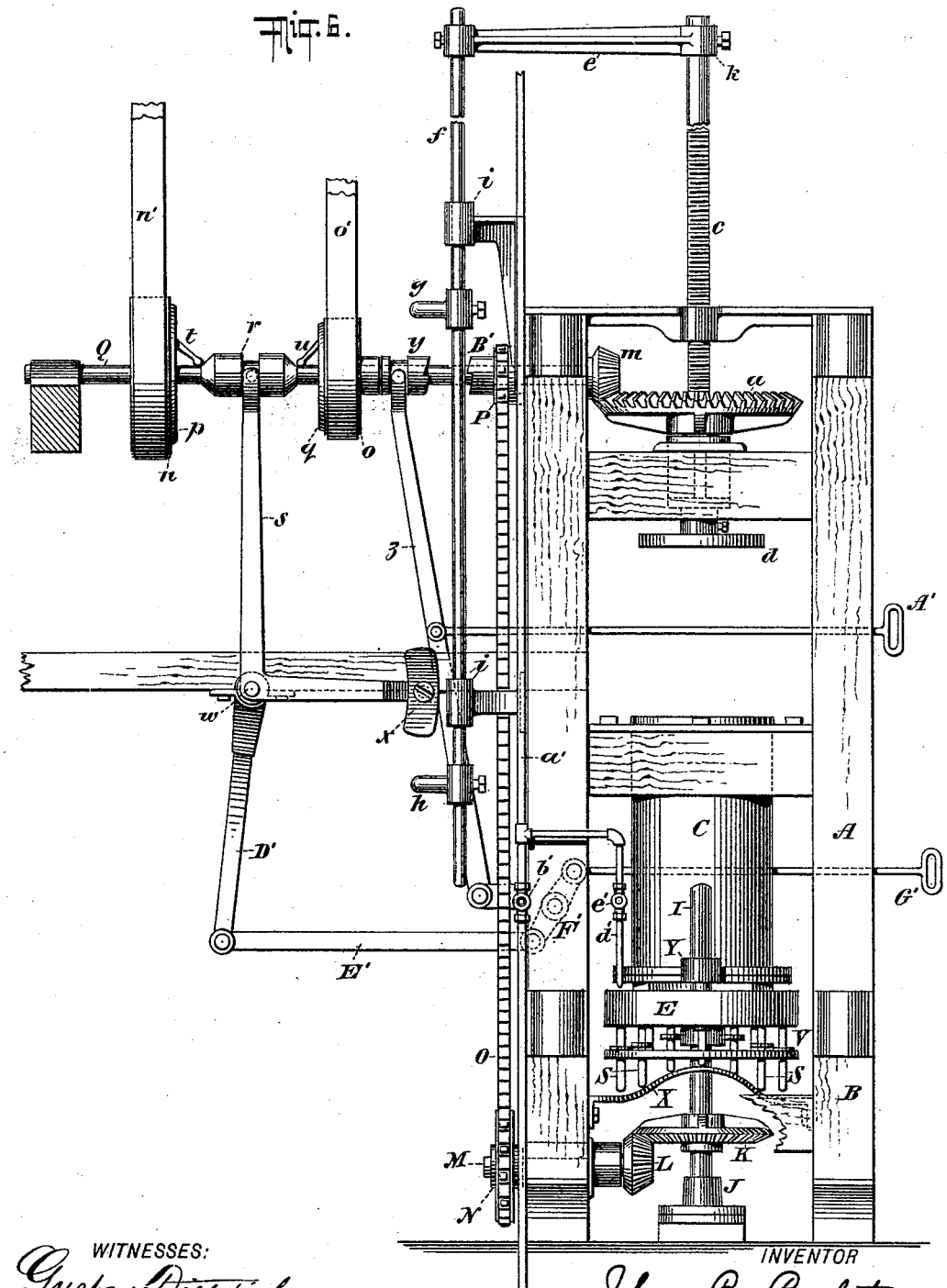

(No Model.) 3 Sheets—Sheet 3.

J. B. PECHT.
MACHINE FOR MOLDING NEUFCHATEL CHEESE.

No. 518,625. Patented Apr. 24, 1894.

WITNESSES:
Gustave Dieterich
John Kehlenbeck

INVENTOR
John B. Pecht,
BY
Chas. C. Gill
ATTORNEY.

UNITED STATES PATENT OFFICE.

JOHN B. PECHT, OF NEW YORK, N. Y., ASSIGNOR TO CHRISTINE BAUMERT, OF SAME PLACE.

MACHINE FOR MOLDING NEUFCHÂTEL CHEESE.

SPECIFICATION forming part of Letters Patent No. 518,625, dated April 24, 1894.

Application filed January 4, 1894. Serial No. 495,638. (No model.)

*To all whom it may concern:*

Be it known that I, JOHN B. PECHT, a citizen of the United States, and a resident of New York, in the county of New York and State of New York, have invented certain new and useful Improvements in Machines for Molding Neufchâtel Cheese, of which the following is a specification.

The invention relates to improvements in machines for molding Neufchâtel cheese, and consists of a machine embracing in its structure a cylinder into which the cheese in bulk is placed and which has an open top and an outlet aperture or slot in its bottom, a revoluble dial containing a series of molds which are carried beneath said outlet and receive and give form to the cheese, a presser-plate which enters the open top of the cylinder and has a gradually descending movement against the cheese to force it from the outlet into said molds, and a series of vertically movable plungers in said molds to force the cakes of cheese upward therefrom.

The invention consists further in novel mechanism hereinafter described whereby the operative parts of the machine receive their movement, and whereby also when the presser-plate reaches its lower position on its descent and its upper position on its ascent the operative parts will automatically cease their movement; and said invention consists further in certain novel features of construction, all as hereinafter fully described and particularly pointed out in the claims.

While I do not confine the invention in every instance to the molding of Neufchâtel cheese into the well known marketable cakes, the machine shown and described has been specially designed and invented for that purpose.

In the art to which the invention pertains it has been found very difficult to produce any machine which would satisfactorily mold Neufchâtel cheese, the latter being of a nature and consistency rendering it almost impossible to handle the same by machinery.

The object of my invention is to produce a machine which will be automatic and capable of rapidly and successfully molding Neufchâtel cheese into cakes without handling the same, ready to receive the foil wrapping in which they are marketed, and this object I have fully accomplished in the machine made the subject hereof and which is illustrated in the accompanying drawings forming a part of this application.

Referring to the accompanying drawings: Figure 1 is a vertical section, on the line 1—1 of Fig. 7, of a machine constructed in accordance with and embodying the invention. Fig. 2 is a transverse section of same on the dotted line 2—2 of Fig. 1. Fig. 3 is an enlarged detached vertical section through a portion of the gearing of the machine. Fig. 4 is a central vertical section through one of the molds of the revolving dial and illustrating the position of the plunger therein when the mold is open to receive the cheese. Fig. 5 is an enlarged detached elevation partly in section of the plunger rod of the mold shown in Fig. 4 and illustrating particularly the means of adjusting the collar on said rod whereby the depth of the mold may be regulated. Fig. 6 is a front elevation of a machine constructed in accordance with and embodying the invention; and Fig. 7 is a top view of same.

In the drawings A, B, designate the supporting frames of the machine. Within the frame A is secured the vertical cylinder C having an open upper end and provided in its base with the elongated segmental exit opening D, the latter being shown more clearly in Fig. 2. On a horizontal plane lower than the cylinder C is mounted the revoluble dial E, which, as illustrated in Fig. 2, is provided with the series of vertical openings F which constitute molds, and as the said dial E is revolved, will be carried below the elongated segmental opening D in the base of the cylinder C and receive the cheese therefrom. The dial E will preferably be a metal casting having an outer rim containing the molds F and supported upon the ends of the spokes G radiating from a hub H, as illustrated in the drawings. Passing centrally through the hub H and keyed thereto is the vertical shaft I, seated in the base J and provided with the bevel gear wheel K which engages the bevel-pinion L secured upon the inner end of the horizontal shaft M, whose outer end, as illustrated in Fig. 6, carries the sprocket wheel N, engaging the chain O which connects said sprocket wheel N with a sprocket wheel P on the main driving shaft Q. The purpose of the sprocket wheels N, P, chain O and gear wheels K, L, is to effect the rotation of the shaft I and dial E at the proper time from the main driving shaft Q.

Within each of the molds F of the revolving dial E is provided a vertically movable plunger R, which constitutes the bottom of the mold and carries a rod S having a collar T and passing downward through apertures in the circular plate V which revolves with the dial E and is directly below the same. The collar T on each plunger rod S is adjustable vertically by means of a screw W, shown in Fig. 5, and said collar in addition to being vertically adjustable for the purpose of regulating the depth of the mold F rests upon the plate V when the rod S is otherwise unsupported and prevents the said rod and plunger R from escaping from the dial E. In Fig. 4 the position illustrated for the collar T is that which will be given to it when the plunger R is to descend to its lowermost position in the mold F, and it will be obvious that when the collar F is by means of the screw W adjusted further down the plunger rod S the plunger rod R will necessarily assume a higher position in the mold F and hence will to the extent of its elevation decrease the interior capacity of said mold.

The cheese to be molded into forms or cakes is placed in bulk within the cylinder C, as illustrated in Fig. 1, and the molds F as they pass the elongated slot D in the bottom of said cylinder are filled with the cheese and carried from below the said cylinder, and hence the plungers R of the molds F must assume their lower position as the molds pass toward and beneath the cylinder C; but as the molds are filled with the cheese and recede from the said cylinder, it is desirable and even necessary that the plunger rods S be gradually elevated in order that the plunger R may force the forms or cakes of cheese upward from the said molds F, and to this end I provide below the outer portion of the plate V the inclined segmental plate X up which the plunger rods S ride as they recede from the cylinder C and down which they pass when approaching the cylinder C, as indicated more clearly in Figs. 1 and 6.

Directly over the hub H of the revoluble dial E is the collar or bearing Y for the upper portion of the vertical shaft I, said bearing being formed integral with the cylinder C and serving to retain the due relationship of the dial E with the said cylinder, thus preventing the mold F under any straining of the machinery from becoming out of register with the elongated slot D formed in the bottom of said cylinder.

In a cross-bar in the upper portion of the frame A is mounted the bevel gear wheel $a$ having the interior threaded sleeve $b$ which receives the threaded vertical spindle $c$ carrying at its lower end the presser-plate $d$ and secured at its upper end to a bar $e$ which connects said spindle with the vertical rod $f$ carrying the arms $g, h$, and adapted to move vertically in the retaining sleeves or collars $i, i$, shown more clearly in Fig. 6. The vertical threaded spindle $c$ is adapted at its upper and lower ends to revolve in the collar $j$ of the presser-plate $d$ and the collar $k$ of the connecting arm $e$ without turning either said plate $d$ or said collar $k$, the purpose being to permit a vertical movement of said spindle $c$ and plate $d$ without any tendency on the part of said plate to revolve against the upper surface of the cheese located in the cylinder C. The beveled gear wheel $a$ is engaged by the bevel pinion $m$ mounted upon the inner end of the main driving shaft Q, and during the revolution of said shaft Q the power is communicated therefrom through the bevel-pinion $m$ to the said bevel gear wheel $a$ which, owing to the interior threaded sleeve $b$ will cause the spindle $c$ to have a vertical reciprocating motion either upward or downward according to the direction of the movement of the bevel gear wheel $a$; and during the reciprocating movement of the spindle $c$ the rod $f$ will have a corresponding motion due to the fact that the said rod through the arm connection $e$ is carried by said spindle.

Upon the main driving shaft Q is provided the two driving wheels $n, o$, which are normally loose upon the inclosed friction clutches $p, q$, of ordinary well-known construction; and between said clutches $p, q$, there is upon the shaft Q, the sliding block $r$ having a central groove to receive the upper bifurcated end of the bell crank lever $s$ and having also the beveled outer ends adapted when the block $r$ is moved to engage the levers $t$ or $u$ of the said clutches $p, q$, for the purpose of engaging the clutch with the belt wheel inclosing the same and thus in effect locking the said belt wheel to the shaft Q in order that upon the application of power to the belts the shaft may receive motion in the customary manner. The levers $t, u$, are usual features of the clutches $p, q$, and are simply pivoted arms against which the beveled ends of the block $r$ may press to force the clutches outward against the inner surface of the rim of the belt wheels in the usual manner to connect the wheels and shaft. The bell crank lever $s$ is mounted upon the shaft $w$ and carries upon the outer end of its short arm the plate $x$ the purpose of which will be hereinafter explained.

At the right of the belt wheel $o$ there is on the driving shaft Q, the sliding clutch $y$ engaged by the upper bifurcated end of the pivoted arm $z$ which is provided with a handle rod A′ by which when desired the said arm $z$ may be moved by hand; and at the right of the clutch $y$ there is upon the driving shaft Q the sprocket wheel P having upon one side the toothed clutch B′ adapted to be engaged by the clutch $y$ at the proper time, the said clutch $y$ being feathered on the shaft Q, while the sprocket wheel P and clutch B' are loose upon said shaft.

Upon the shaft $w$ is secured the lever D' whose lower end is by means of the link E' connected with one end of the centrally pivoted lever F', whose other end is provided with the handle rod G' by which the said lever F' may be rocked upon its pivotal bearing and effect the reciprocation of the link E' and the oscillation of the arm D', the result being to rock the shaft $w$ and thereby secure the movement of the bell crank lever $s$, causing the upper end of the latter to move the block $r$ on the driving shaft Q. either toward the clutch $p$ or the clutch $q$ in accordance with the motion applied to said handle rod G' and the direction in which it is desired that the shaft Q shall revolve.

When the handle rods A', G', are in the position in which they are illustrated in Fig. 6, the belt wheels $n$, $o$, will be loose upon their clutches $p$, $q$, and the clutch $y$ will be free of the clutch B', and at such time the belts will be unable to apply power to the shaft Q, the belt wheels $n$, $o$, being at such time idle. When it is desired to proceed with the operation of the machine, the cheese being placed within the cylinder C and the presser-plate $d$ being in the position illustrated in Fig. 6, the attendant will push the handle rod G' inward, thus rocking the shaft $w$ to throw the lever $s$ toward the left and causing the engagement of the clutch $p$ with the wheel $n$, at which time the power will be transmitted through the belt $n'$ and wheel $n$ to the clutch $p$ and shaft Q, which revolving will cause the bevel wheel $m$ and bevel wheel $a$, with the sleeve $b$ of the latter, to effect the downward travel at a slow rate of speed of the threaded vertical spindle $c$ carrying at its lower end the pressure plate $d$. This particular condition and operation of the machine may continue uninterruptedly until the pressure plate $d$ has come into contact with the upper surface of the cheese within the cylinder C, at which time the attendant will by drawing on the rod A' throw the clutch $y$ into engagement with the clutch B', the effect of which will be that the motion of the driving shaft Q will be communicated to the sprocket wheel P, chain O, sprocket wheel N, shaft M, bevel-pinion L, bevel gear wheel K, vertical shaft I and revoluble dial E, the latter carrying its mold F beneath the outlet D from the cylinder C, while the pressure of the plate $d$ forces the cheese outward through said outlet D into the molds as they pass below the cylinder C. The engagement of the clutch $p$ with the wheel $n$ and the clutch $y$ with the clutch B' will be continued until the pressure plate $d$ has reached the bottom of the cylinder C and forced substantially all of the cheese therefrom, at which time, owing to the devices which will presently be described, the downward movement of the spindle $c$ will automatically cease. During the downward travel of the vertical threaded spindle $c$ the rod $f$ has a simultaneous downward movement and carries the arms $g$, $h$ in line with the plate $x$ secured upon the short arm of the bell crank lever $s$. The adjustment of the arm $g$ on the rod $f$ is such that when the pressure plate $d$ reaches the bottom of the cylinder C, the said arm $g$ will come into contact with the said plate $x$ and move the same downward a suitable distance to effect the extent of movement in the bell crank lever $s$ which will throw the block $r$ on the driving shaft Q into its neutral position between the clutches $p$, $q$ at which time the belt wheel $n$ will be idle and the driving shaft Q will cease its movement, thus when the plate $d$ has reached its lower position in the cylinder C the arm $g$ will actuate the mechanism to automatically stop the machine. After the plate $d$ has reached its lower position and expelled the cheese from the cylinder C into the mold F of the revoluble dial E, it will be necessary to effect the upward movement of said plate $d$ in order that the cylinder C may be re-charged with the cheese. This upward movement of the plate $d$ is effected by drawing rod G' outward, thus forcing the link E' inward and rocking the bell crank lever $s$ toward the right, whereby the block $r$ is caused to effect the engagement of the clutch $q$ with the belt wheel $o$ and at this time the belt $o'$ on said wheel $o$ (which belt travels in a direction opposite to that of the belt $n'$) will revolve the shaft Q and bevel pinion $m$ and, through the bevel gear wheel $a$ and its sleeve $b$, cause the threaded spindle $c$ to travel upward with the rod $f$. At the time the said spindle $c$ has traveled upward sufficiently to bring the plate $d$ to its upward position, shown in Fig. 6, the arm $h$ on the rod $f$ will come into contact with the lower end of the plate $x$ on the bell crank lever $s$ and by its pressure return said lever $s$ to its normal position in which it will hold the block $r$ on the driving shaft Q in a neutral relation between the clutches $p$, $q$, the motion of the machine being thereby automatically stopped. During the upward travel of the threaded spindle $c$ the dial E will remain at rest owing to the inclination of the teeth of the clutches $y$, B', and the fact that the shaft Q moves in a reverse direction to that it is caused to have from the belt wheel $n$. If preferred, however, prior to the starting upward of the spindle $c$ and plate $d$ the attendant may by pushing on the handle rod A' separate the clutches $y$, B', and thus insure the clutch B' and sprocket wheel P remaining idle on the shaft Q.

At one side of the receiving cylinder C is provided the steam pipe $a'$ having a valve $b'$ and a branch connecting pipe $d'$ provided with a valve $e'$. The purpose of the pipes $a'$, $d'$, is to afford a means of injecting steam into the molds F prior to their entering below the cylinder C to receive the cheese therefrom. By means of the valve $e'$ the egress of the steam from the pipe $d'$ may be regulated at will. The nature of Neufchâtel cheese is such as to render it difficult to remove the forms or cakes from the molds F, and to overcome this difficulty and to render it easy for the cheese to be ejected from the molds F without disturbing the forms of the cakes, I have provided the steam pipe $d'$ by means of which the interior of the molds F may be heated preparatory to receiving the cheese. It is not the purpose of the invention to heat the entire dial E, but simply the interior surfaces of the molds F sufficiently to prevent the cheese from sticking to said surfaces. That portion of the steam pipe $a'$ below the upper end of the branch connection $d'$ will receive and conduct away any water which may be in the pipe $a'$, thus preserving the steam issuing from the pipe $d'$ as dry as possible. The valve $b'$ will regulate the extent of the opening in the pipe $a'$ below its point of connection with the pipe $d'$.

The operation of the machine made the subject hereof will be understood from the foregoing description, in which the movement and purpose of the parts have been described in connection with the construction of the same. It may be stated, however, that when the parts of the machine are in the position illustrated in Fig. 6, the mechanism will be at rest and the cylinder C ready to receive the cheese in bulk. Upon the placing of the cheese into the cylinder C, the rod $G'$ will be drawn outward and the bell crank levers $s$ thereby thrown toward the left and effect the engagement of the clutch $p$ with the belt wheel $n$. The power from the belt $n'$ will then effect the revolving of the wheel $n$ and driving shaft Q, the immediate effect being that the bevel wheel $m$ and the bevel wheel $a$ will have a revolving motion and cause the descent of the presser-plate $d$ to the upper surface of the cheese. After the plate $d$ has reached the upper surface of the cheese the attendant will by drawing on the rod $A'$ effect the engagement of the clutches $y$, $B'$, in order that during the continued movement of the driving shaft Q and the continued descent of the presser-plate $d$ the dial E may receive its revolving motion from the driving shaft through the sprocket wheels P, N, chain O and bevel gear wheels K, L. During the revolving motion of the dial E the molds F pass beneath the cylinder C and are filled with the cheese, the forms or cakes of which are ejected from the molds, when the latter reach the front of the machine, by means of the plungers R whose rods S travel upon the inclined plate or tramway X. The attendant will during the revolving of the dial E heat the interior surface of the molds F by steam issuing from the pipe $d'$.

What I claim as my invention, and desire to secure by Letters Patent, is—

1. In a machine for molding cheese, the receiving cylinder having an open top and a bottom provided with an outlet aperture, the presser plate adapted to enter said cylinder and mechanism connected with said plate for causing its gradual descent against the cheese to slowly expel the same through said outlet, combined with the horizontal revoluble dial containing along its outer upper surface the concentric series of vertical molds adapted to pass below said outlet, the vertical shaft for said dial and located beyond the vertical center of said cylinder so that only a small portion of the dial is below the cylinder at any one time, mechanism intermediate said vertical shaft and the driving shaft of the machine, the plungers in said molds and having the downwardly extending rods, the apertured plate below said dial through which said rods pass, and the inclined plate below said apertured plate and on which the lower ends of the plunger rods ride; substantially as and for the purposes set forth.

2. In a machine for molding cheese, the receiving cylinder having an open top and a bottom provided with an outlet aperture, the presser plate entering said cylinder and adapted to gradually descend against the cheese, mechanism connected with the driving shaft and said plate for effecting the gradual descent and ascent of the latter, two drive wheels and clutches on said shaft, and mechanism intermediate said plate and drive wheels for releasing the clutches at the ends of the movement of said plate, combined with the horizontal revoluble dial containing along its outer upper surface the concentric series of molds adapted to pass below said outlet, the vertical shaft for said dial and located beyond the vertical center of said cylinder so that only a small portion of the dial is below the cylinder at any one time, mechanism intermediate said vertical shaft and the driving shaft of the machine, the plungers in said molds and having the downwardly extending rods, the apertured plate below said dial through which said rods pass, and the inclined plate below said apertured plate and on which the lower ends of the plunger rods ride; substantially as and for the purposes set forth.

3. In a machine for molding, the receiving cylinder having the open top and an outlet in its bottom, and the presser-plate and its connecting mechanism whereby it is caused to gradually descend into said cylinder and against the cheese, combined with the revoluble dial containing a series of molds in line with said outlet, the plungers in said molds, the plate through which the plunger rods pass, the adjustable collars on said rods above said plate, and the inclined plate on which the lower ends of said rods ride; substantially as set forth.

4. In a machine for molding, the receiving cylinder having an open top and an outlet in its bottom, and the presser-plate and its connecting mechanism whereby it is caused to gradually descend into said cylinder and expel the cheese therefrom, combined with the revoluble dial containing a series of molds in line with said outlet, the vertically reciprocating plungers in said molds, and means for heating the interior of said molds by dry steam; substantially as set forth.

5. In a machine for molding, the receiving cylinder having the open top and an outlet at its bottom, the revoluble dial containing a series of molds in line with said outlet, and the plungers in said molds for expelling the cheese therefrom, combined with the revoluble threaded spindle $c$, the presser-plate $d$ on the lower end of said spindle, the bevel gear $a$ carrying the internally threaded sleeve engaging said spindle, the bevel-pinion $m$ on the driving shaft and engaging said gear $a$, the drive-wheels and clutches on the said driving shaft, the bell-crank lever $s$ the sliding block intermediate said wheels and engaged by said lever $s$, and the rod carrying arms $g$, $h$, and connected to move with the spindle $c$, the said arms $g$, $h$, being adapted during the movement of the spindle $c$ to actuate the lever $s$ to stop the machine; substantially as set forth.

6. In a machine for molding, the receiving cylinder having the open top and an outlet at its bottom, and the revoluble dial containing a series of molds in line with said outlet, combined with the vertical shaft I extending through the dial and carrying the bevel gear K, the shaft M having the bevel-pinion L and sprocket wheel N, the shaft Q having the loose sprocket wheel P, and feathered clutch $y$, the chain O connecting the wheels P, N, the lever for operating clutch $y$, the threaded spindle $c$ carrying the presser-plate $d$, the bevel-gear wheel $a$ having the internally threaded sleeve $b$ which encircles the spindle $c$, and the bevel-pinion $m$ on the driving shaft and engaging said wheel $a$; substantially as set forth.

Signed at New York, in the county of New York and State of New York, this 2d day of January, A. D. 1894.

JOHN B. PECHT.

Witnesses:
 CHAS. C. GILL,
 ED. D. MILLER.